(12) United States Patent
Grattan

(10) Patent No.: US 12,059,946 B2
(45) Date of Patent: Aug. 13, 2024

(54) VEHICLE ROOF ASSEMBLY

(71) Applicant: NISSAN NORTH AMERICA, INC., Franklin, TN (US)

(72) Inventor: Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/900,695

(22) Filed: Aug. 31, 2022

(65) Prior Publication Data

US 2024/0066966 A1    Feb. 29, 2024

(51) Int. Cl.
  *B60J 10/00*    (2016.01)
  *B60J 10/24*    (2016.01)
  *B60J 10/32*    (2016.01)
  *B60J 10/84*    (2016.01)

(52) U.S. Cl.
  CPC .............. *B60J 10/84* (2016.02); *B60J 10/24* (2016.02); *B60J 10/32* (2016.02)

(58) Field of Classification Search
  CPC ............. B60J 10/84; B60J 10/24; B60J 10/32
  See application file for complete search history.

(56) References Cited

U.S. PATENT DOCUMENTS

| | | | |
|---|---|---|---|
| 7,685,777 B2 | 3/2010 | Nozaki et al. | |
| 8,893,438 B2 | 11/2014 | Hamada et al. | |
| 9,126,472 B2 | 9/2015 | Fukuda | |
| 2008/0000165 A1* | 1/2008 | Ochiai | B60J 10/84 49/490.1 |
| 2009/0266000 A1 | 10/2009 | Minoura et al. | |

FOREIGN PATENT DOCUMENTS

| | | | | |
|---|---|---|---|---|
| DE | 102011110731 A1 * | 2/2013 | ............. | B60J 10/84 |
| EP | 1886859 A2 | 2/2008 | | |
| JP | 4059448 B2 | 3/2008 | | |
| JP | 2011-111109 A | 6/2011 | | |
| JP | 5984510 B2 | 9/2016 | | |
| JP | 6117546 B2 | 4/2017 | | |

* cited by examiner

*Primary Examiner* — Daniel J Troy
*Assistant Examiner* — Daniel Alvarez
(74) *Attorney, Agent, or Firm* — Global IP Counselors, LLP

(57) ABSTRACT

A vehicle roof panel assembly includes a roof panel, a seal and an head. The roof panel partially defines a rear hatch opening. The seal is fitted over a rear portion of the roof panel at a location adjacent to the rear hatch opening. The seal has a longitudinal length extending laterally across the rear portion. The bead is disposed on the rear portion of the roof panel. The bead has a longitudinal length extending laterally across the rear portion. The bead contacts the seal along the longitudinal length of the seal.

14 Claims, 5 Drawing Sheets

VEHICLE ROOF ASSEMBLY

BACKGROUND

Technical Field

The present disclosure generally relates to a vehicle roof assembly. More specifically, the present disclosure relates to a vehicle roof assembly having a water deflection member.

Background Information

A motor vehicle has openings such as door openings, a trunk room openings, rear hatch openings etc. Weatherstrips can be attached to opening surfaces around these openings to form seals between the opening surfaces and closing members for closing the openings, such as doors, trunk lids, etc.

SUMMARY

In view of the state of the known technology, one aspect of the present disclosure is to provide a vehicle roof panel assembly comprising a roof panel, a seal and an bead. The roof panel partially defines a rear hatch opening. The seal is fitted over a rear portion of the roof panel at a location adjacent to the rear hatch opening. The seal has a longitudinal length extending laterally across the rear portion. The bead is disposed on the rear portion of the roof panel. The bead has a longitudinal length extending laterally across the rear portion. The bead contacts the seal along the longitudinal length of the seal.

In view of the state of the known technology, one aspect of the present disclosure is to provide a vehicle comprising a roof panel, a pair of side body panels and a vehicle door. The roof panel has a vehicle rooftop portion and a rear portion that is recessed and extends rearward with respect to the vehicle rooftop portion. The rear portion includes a water deflecting bead protruding upward along a planar surface of the rear portion of the roof panel. The side body panels and the roof panel together define a rear hatch opening. The vehicle door is openable and closeable over the rear hatch opening to cover the rear portion of the roof panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
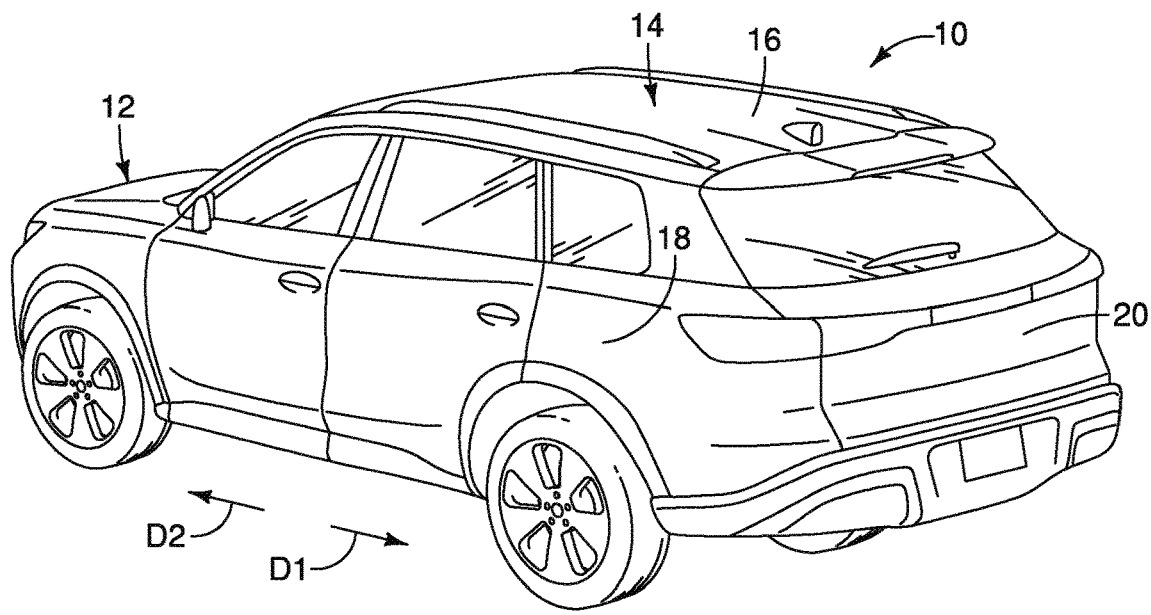
FIG. 1 is a rear perspective view of a vehicle equipped with a roof assembly in accordance with an illustrated embodiment.

Referring initially to FIG. 1, a vehicle 10 comprises a vehicle body 12 having a vehicle roof assembly 14. The vehicle as shown is a sports utility vehicle. However, it will be apparent to those skilled in the vehicle field from this disclosure that the vehicle 10 can alternatively be another type of vehicle such as a sedan or a van. The vehicle roof assembly 14 includes a roof panel 16. The vehicle 10 further includes a pair of side body panels 18 and a rear hatch 20. The vehicle body 12 is formed by connecting the roof panel 16 and the side body panels 18 along with other panels of the vehicle 10.

The roof panel 16 and the side body panels 18 can be connected together by superimposing the side body panels 18 to the lateral sides of the roof panel 16 and spot welding the panels. The side body panels 18, the roof panel 16 and a vehicle floor together define a rear hatch opening 22 of the vehicle. Therefore, the roof panel 16 partially defines the rear hatch opening 22. The rear hatch opening 22 includes a top circumferential edge 22A, a bottom circumferential edge (not shown), and a pair of side circumferential edges 22B that extend between the top and bottom circumferential edges. The rear hatch 20 is movable with respect to the roof panel 16 and the side body panels 18. The rear hatch 20 is movable to open and close over the rear hatch opening 22.

Figure 2:
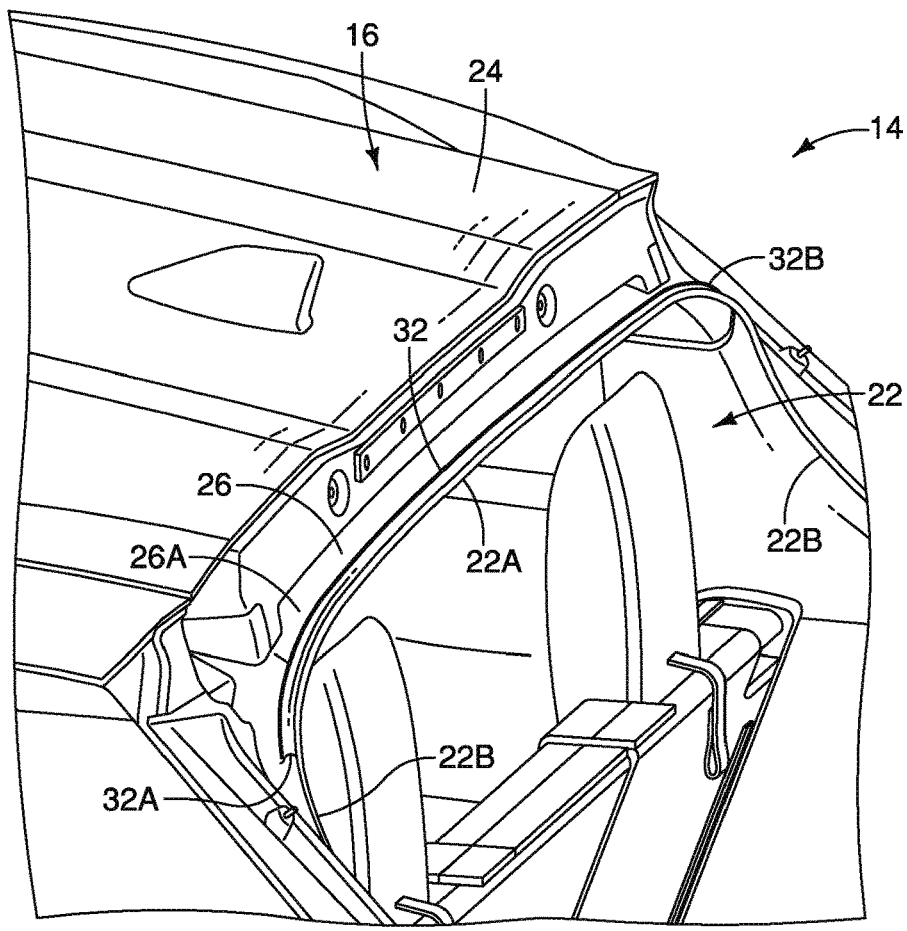
FIG. 2 is an enlarged partial view of the vehicle of FIG. 1 with a vehicle rear hatch removed to show portion of the roof assembly.

As seen in FIG. 2, the roof panel 16 includes a vehicle rooftop portion 24 and a rear portion 26. The rooftop portion 24 defines a roof for the vehicle 10 and the rear portion 26 is recessed with respect to the rooftop portion 24. The rear portion 26 is recessed and extends in a rearward direction D1 of the vehicle 10 with respect to the vehicle rooftop portion 24. In particular, the rear portion 26 includes a planar surface 26A that extends in the vehicle rearward direction D1 with respect to the rooftop portion 24, As used herein, the term "rearward direction D1" will refer to a direction that is towards the vehicle's 10 rear. The term "forward direction D2" will refer to a direction that is towards the front of the vehicle 10.

In the illustrated embodiment, the rooftop portion 24 and the rear portion 26 are integrally formed made of stamped metal. In particular, the rooftop portion 24 and the rear portion 26 can be a single unitary piece of stamped metal. However, it will be apparent to those skilled in the vehicle field from this disclosure that the rooftop portion 24 and the rear portion 26 can be separately formed and welded together.

The rear hatch 20 opens and closes over the rear portion 26 of the roof panel 16. In particular, the rear hatch 20 exposes the rear portion 26 when in the open position as seen in FIG. 2 in which the rear hatch 20 is removed. The rear hatch 20 closes over the rear portion 26 when in the closed position as seen in FIG. 1. In other words, the rear hatch 20 is openable and closeable over the rear hatch opening 22 to cover the rear portion 26 of the roof panel 16.

Figure 4:
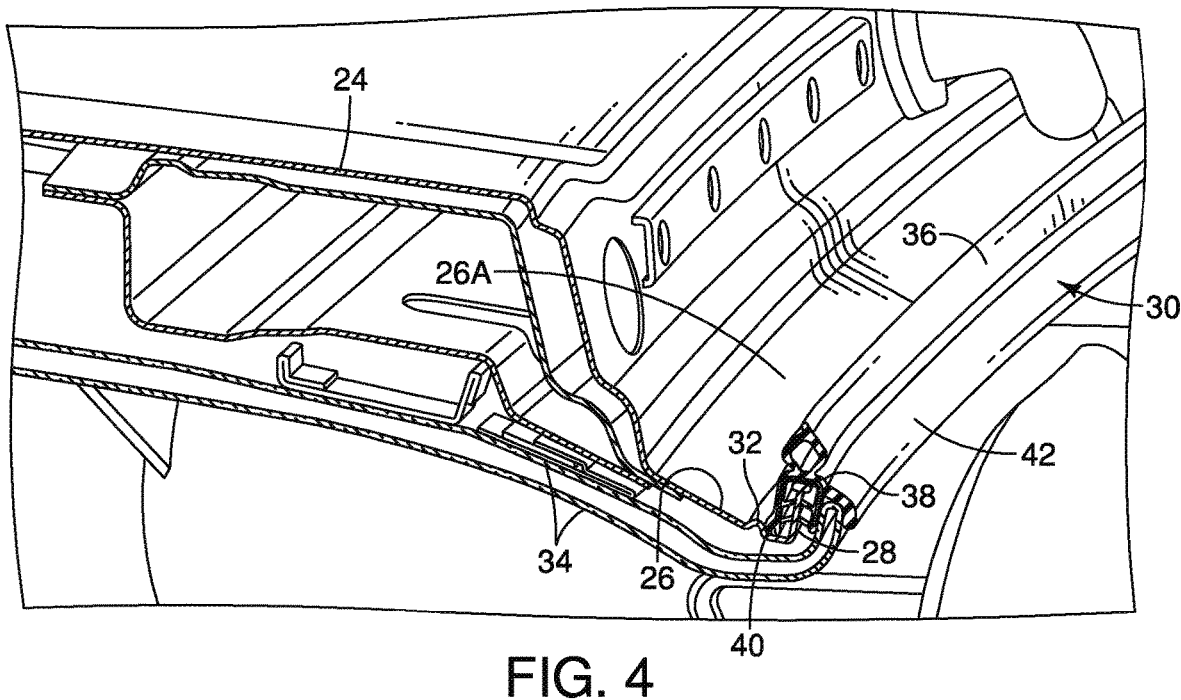
FIG. 4 is a cross-sectional view of the roof assembly of FIG. 3.
Figure 5:
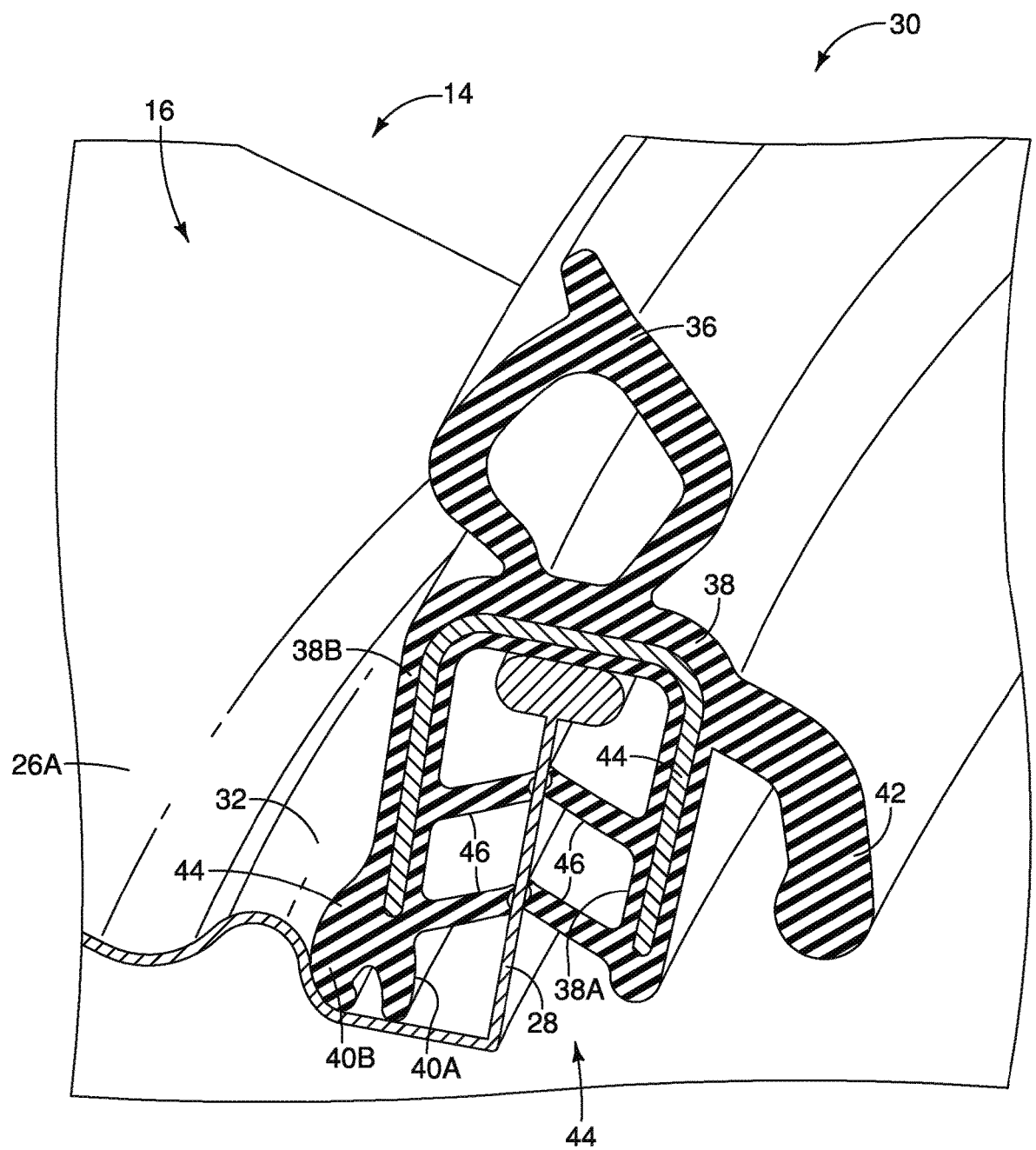
FIG. 5 is an enlarged cross-sectional view of the roof assembly showing a water deflecting bead positioned by the weatherstrip.

As seen in FIGS. 2, 4 and 5, the roof panel 16 includes an upwardly extending flange 28 provided at or adjacent to the top circumferential edge 22A of the rear hatch opening 22. The roof panel 16 includes the flange 28. The vehicle roof assembly 14 further comprises a seal 30. The seal 30 is attached to the flange 28 of the roof panel 16 to form the weatherstrip 30. That is, the seal 30 is a weatherstrip 30 for the vehicle roof panel 16 provided to prevent water intrusion through the rear hatch opening 22. The weatherstrip 30 is also provided over the flange 28 to help prevent corrosion to the flange 28.

In the illustrated embodiment, the vehicle roof assembly 14 further includes a water deflecting bead 32 that is adjacent to the weatherstrip 30. In particular, the rear portion 26 includes the bead 32 that protrudes upwardly from the planar surface 26A of the rear portion 26 of the roof panel 16. The bead 32 is a rib that helps prevent water intrusion in the vehicle rearward direction D1 into the interior of the weatherstrip 30, as will be further discussed below.

As best seen in FIG. 4, the vehicle 10 further includes a headliner 34. That is, the vehicle roof panel 16 further includes the headliner 34. The headliner 34 is a fabric panel that covers vehicle's 10 interior ceiling to hide the metal of the roof panel 16, The headliner 34 preferably includes multiple layers of fabric including foam material such as polyurethane. As shown, the headliner 34 is fixed to the weatherstrip 30 at a rearward concealing lip 42 of the weatherstrip 30. The headliner 34 has an end attached to the weatherstrip 30 at a location in the vehicle rearward direction D1 with respect to the weatherstrip 30.

During rain or during car washing, a large volume of water can run off from the rooftop portion 24 rearward and get into the rear portion 26 of the roof panel 16. Water can then travel into the weatherstrip 30 and corrode the flange 28 and or the circumferential edge of the rear hatch opening 22. Water intrusion through the weatherstrip 30 can also reach the headliner 34 and cause mold. Therefore, the bead 32 is provided at a location in the vehicle forward side of the weatherstrip 30 to help deflect water away from the weatherstrip 30.

Figure 3:
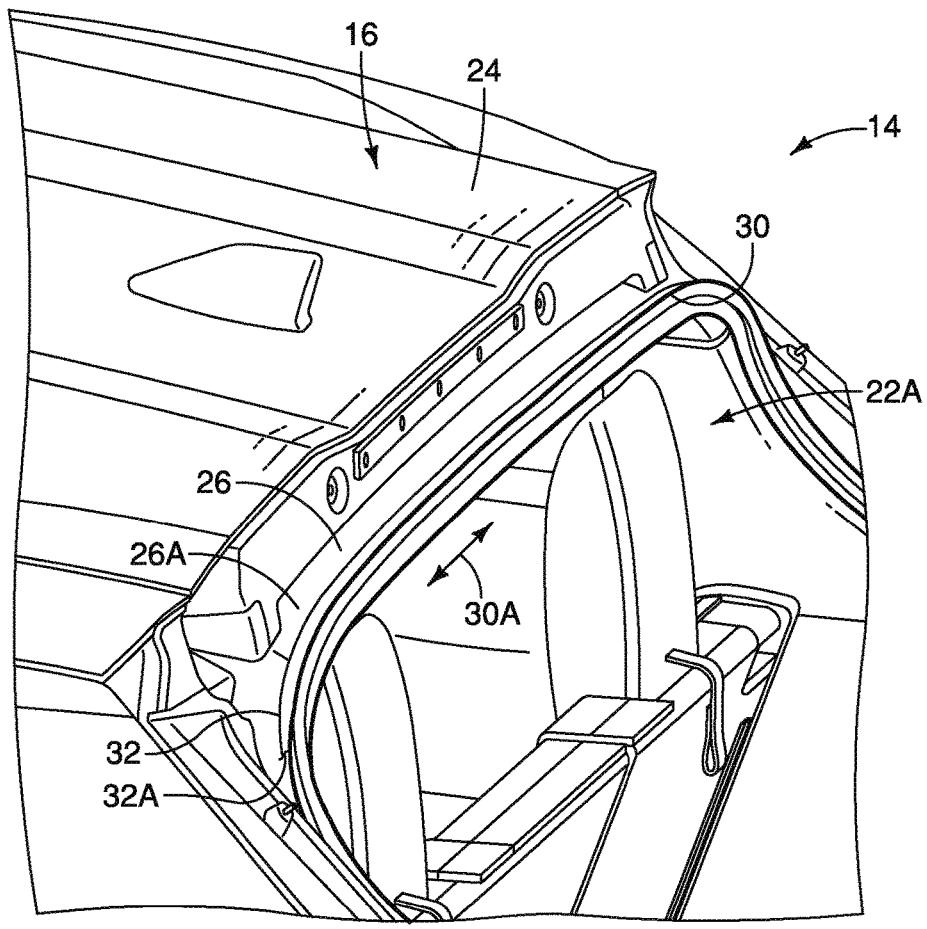
FIG. 3 is an enlarged partial view of the vehicle similar to FIG. 2 but with a weatherstrip installed on the roof assembly.

As best seen in FIGS. 3 and 4, the weatherstrip 30 is fitted over the rear portion 26 of the roof panel 16 at a location adjacent to the rear hatch opening 22. The weatherstrip 30 is a single-piece elongated member made of a polymer material. The weatherstrip 30 is mounted over the flange 28 to cover a gap that would otherwise exist between the circumferential edge of the rear hatch opening 22 and the rear hatch 20 when the rear hatch 20 is closed over the rear hatch opening 22. The weatherstrip 30 has a longitudinal length extending laterally across the rear portion 26. That is, the weatherstrip 30 extends across the rear portion 26 of the roof panel 16 in the widthwise direction 30A across the roof panel 16. Preferably, the weatherstrip 30 extends around an entire perimeter of the rear batch opening 22.

Referring to FIG. 5, the weatherstrip 30 includes a hollow sealing portion 36, a main attachment portion 38, a forward concealing lip 40 and a rearward concealing lip 42. The forward concealing lip 40 extends in the vehicle forward direction D2 of the main attachment portion 38 when the weatherstrip 30 is attached to the flange 28. The rearward concealing lip 42 extends in the vehicle rearward direction D1 from the main attachment portion 38 when the weatherstrip 30 is attached to the flange 28. The weatherstrip 30 has a receiving slot 44 formed between the forward and rearward concealing lip 40 and 42. The flange 28 is received through the receiving slot 44.

The hollow sealing portion 36 extends upward from the main attachment portion 38. When the rear hatch 20 is closed over the rear hatch opening 22, the rear hatch 20 comes into contact with the hollow sealing portion 36 which elastically deforms upon contact. In this way, the weatherstrip 30 seals the gap between the rear hatch 20 and the roof panel 16 and also between the rear hatch 20 and the side body panels 18.

As best seen in FIG. 4, the bead 32 preferably contacts the forward concealing lip 40. The forward concealing lip 40 has an interior surface 40A facing the receiving slot 44 and an exterior surface 40B facing away from the receiving slot 44. In the illustrated embodiment, the bead 32 contacts the exterior surface 40B of the forward concealing lip 40.

As best seen in FIG. 5, the main attachment portion 38 includes an interior side-wall 38A, an exterior sidewall 38B and a core 44 sandwiched between the interior and exterior sidewall 38Bs. The forward concealing lip 40 extends integrally from the main attachment portion 38 at the forward side. The rearward concealing lip 42 extends integrally from the main attachment portion 38 at the rearward side. The interior sidewall 38A includes a plurality of holding lips 46 extending from the interior sidewall 38A. The holding lips 46 grip onto the flange 28 when the weatherstrip 30 is attached to the flange 28. In particular, the holding lips 46 elastically deform to sandwich the flange 28 from both the exterior and interior sides of the weatherstrip 30.

The weatherstrip 30 is basically formed from solid rubber materials, such as an ethylene propylene diene (EPDM) solid material, except for the core 44 which is preferably made of metal. The weatherstrip 30 can include sponge rubber materials, such as an EPDM sponge material having specific gravity that is smaller than the solid rubber material. The core 44 of the weatherstrip 30 is preferably a metallic or resin sheet sandwiched into the attachment portion by insert extrusion molding.

Referring to FIGS. 4 and 5, in the illustrated embodiment, the bead 32 that is formed from stamping the roof panel 16. As stated, the bead 32 acts as a break to diminish the pressure of water flowing down the roof panel 16 in the rearward direction D1. Further, the bead 32 is provided to deflect the flow of water. In the illustrated embodiment, the bead 32 is provided at position that is forward to and adjacent to the forward concealing lip 40 to prevent water intrusion rearward beneath the forward concealing lip 40.

In particular, the bead 32 is provided to increase as contact surface area between the weatherstrip 30 and the roof panel 16 at the forward side of the weatherstrip 30. The contact surface area between the bead 32 and the weatherstrip 30 effectively forms a barrier against water intrusion and cause water to build up at the top of the bead 32 so that water can effectively flow laterally down the sides of the door opening.

As shown, the bead 32 curves upward from the planar surface 26A of the rear portion 26 such that the curvature of the bead 32 substantially corresponds to the curvature of the forward concealing lip 40. In the illustrated embodiment, the head 32 can have a height between four to ten millimeters. Preferably, the height of the bead 32 is four to five millimeters.

It will be apparent to those skilled in the vehicle field from this disclosure that the shape, size and dimension of the bead 32 and vary depending on modifications to the shape, size and dimensions of the weatherstrip 30 as long as the head 32 is disposed at a location forward of the flange 28 which the weatherstrip 30 attaches to. It will also be apparent to those skilled in the vehicle field from this disclosure that the bead 32 is provided to contact the weatherstrip 30 at a location that is forward of the flange 28 or at a location that is forward of the receiving slot 44 for the flange 28 to prevent water intrusion into the receiving slot 44.

The head 32 is preferably made from stamped metal that is integral with the roof panel 16. The longitudinal length of the head 32 extends laterally across the rear portion 26. The bead 32 is disposed between the weatherstrip 30 and the planar surface 26A of the roof panel 16. As shown, the planar surface 26A of the roof panel 16 is positioned in the vehicle forward direction D2 with respect to the bead 32 such that water flows from the ceiling portion to the planar surface 26A and towards the bead 32. The bead 32 is positioned in the vehicle forward direction D2 with respect to the weatherstrip 30. Therefore, the roof panel 16 includes the planar surface 26A that is positioned in the vehicle forward direction D2 with respect to the bead 32.

Preferably, as best seen in FIG. 2, the bead 32 extends substantially across the entirety of the top circumferential edge 22A of the rear hatch opening 22. More preferably, the bead 32 extends around the side curves of the rear hatch opening 22 and towards the side circumferential edges 22B to help deflect water towards the side.

The bead 32 includes a first longitudinal end 32A and a second longitudinal end 32B that is opposite of the first longitudinal end 32A. The first and second longitudinal end 32Bs face the side body panels 18. As seen in FIG. 4, the bead 32 contacts the weatherstrip 30 along the longitudinal length of the weatherstrip 30. That is, the bead 32 preferably contacts the weatherstrip 30 continuously along the longitudinal length of the weatherstrip 30 that extends along the top edge of the rear hatch opening 22.

Figure 6:
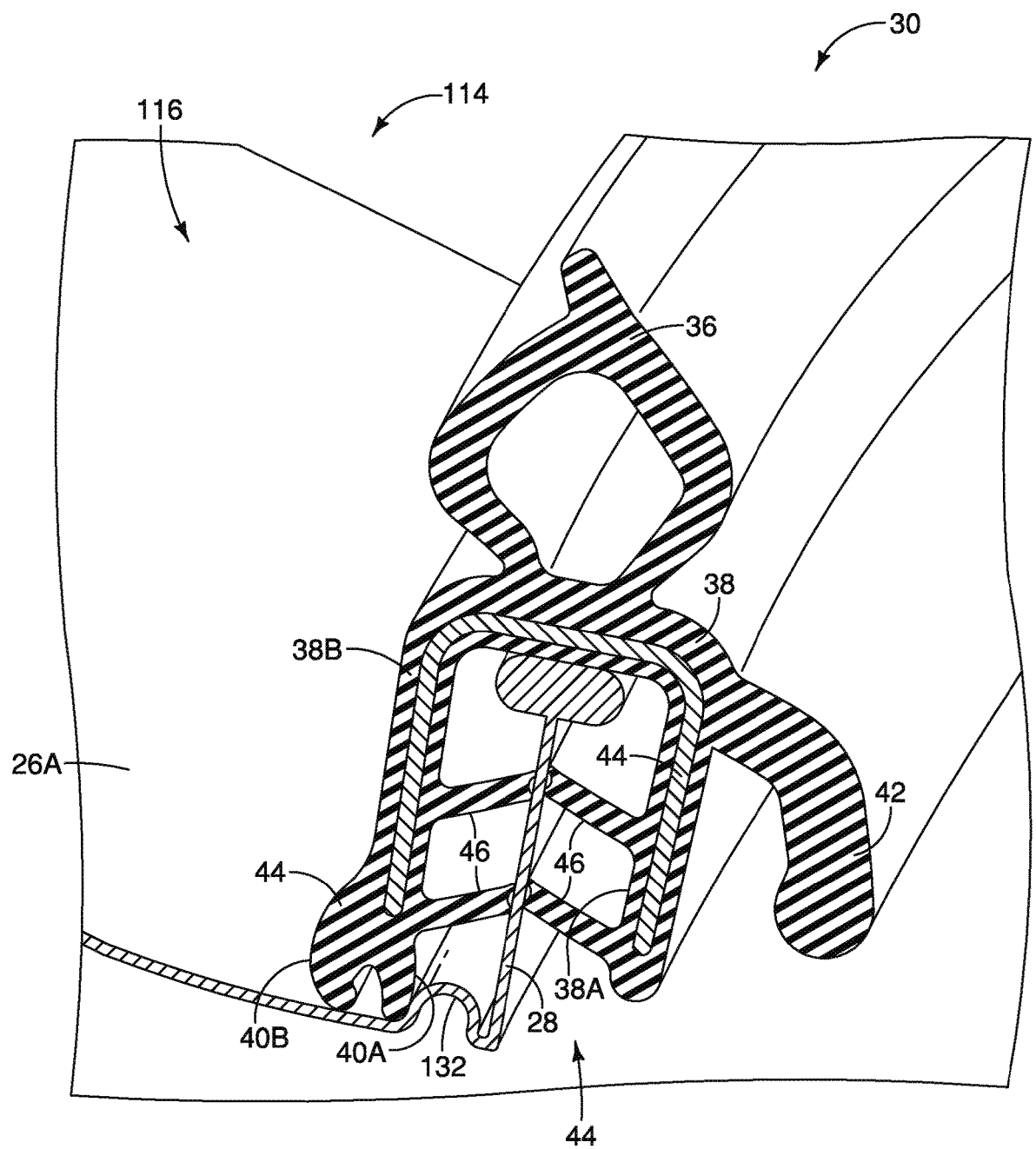
FIG. 6 is an enlarged cross-sectional view of a modified roof assembly having a modified water deflecting bead.
Figure 7:
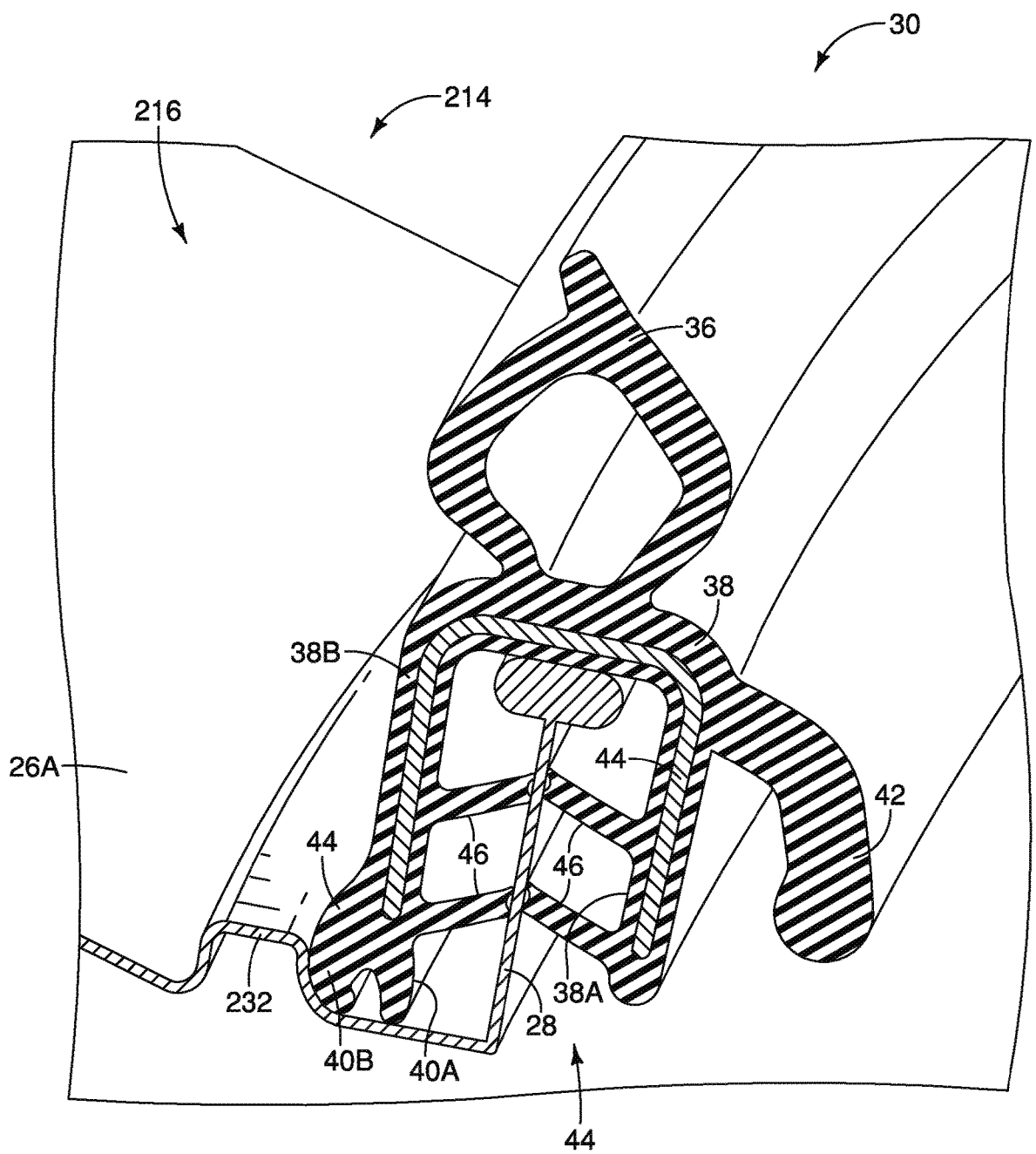
FIG. 7 is an enlarged cross-sectional view of a second modified roof assembly having a second modified water deflecting bead.

Referring now to FIG. 6, a modified vehicle roof assembly 114 that can be implemented with the vehicle of FIG. 1 will now be described. The modified vehicle roof panel 116 includes a vehicle rooftop portion 24 and a modified rear portion 126. The rooftop portion 24 defines a roof for the vehicle 10 and the rear portion 26 is recessed with respect to the rooftop portion 24, The rear portion 26 is recessed and extends in the rearward direction D1 of the vehicle 10 with respect to the vehicle rooftop portion 24.

Due to the similarities between the modified vehicle roof assembly 114 and the roof assembly 14, corresponding structures that are identical will receive the same reference numerals. Components that have been modified will receive the same reference numeral as the corresponding components but increased by 100.

The modified roof panel 116 includes an upwardly extending flange 28 provided a circumferential edge of the rear hatch opening 22 that is identical to the flange 28 of FIGS. 1 to 5. The vehicle roof assembly 114 further comprises a weatherstrip 30 that is attached to the flange 28 of the roof panel 16. The weatherstrip 30 is identical to the weatherstrip 30 of FIGS. 1 to 5 and will not be further discussed. In the illustrated embodiment, the modified vehicle roof assembly 14 further includes a modified water deflecting bead 132 that is adjacent to the weatherstrip 30. The modified bead 132 is positioned between the interior sidewall 38A of the weatherstrip 30 and the receiving slot 44 of the weatherstrip 30.

In particular, the modified bead 132 is positioned between the forward concealing lip 40 of the weatherstrip 30 and the flange 28. Therefore, the modified bead 132 is positioned interiorly of the weatherstrip 30 instead of exteriorly as in FIGS. 1 to 5. It will also be apparent to those skilled in the vehicle field from this disclosure that the vehicle 10 can be provided with a roof assembly 14 having both the bead 32 and the modified bead 132 for prevent water intrusion towards the flange 28.

It will also be apparent to those skilled in the vehicle field from this disclosure that the bead 32 and the modified bead 132 can be provided as a series of beads 32 provided in succession in the vehicle forward direction D2 with respect to the receiving slot 44. For example, the roof panel 16 can include a pair of beads 32 identical the bead 32 that are provided in succession exteriorly of the weatherstrip 30. Additionally, the roof panel 16 can include the modified bead 132 that is provided interiorly of the weatherstrip 30.

Referring now to FIG. 6, a second modified vehicle roof assembly 214 that can be implemented with the vehicle 10 of FIG. 1 will now be described. The second modified vehicle roof panel 216 includes a vehicle rooftop portion 24 and a second modified rear portion 226. Due to the similarity between the second modified vehicle roof assembly 214 and the roof assembly 14, corresponding structures that are identical will receive the same reference numerals. Components that have been modified will receive the same reference numeral as the corresponding components but increased by 200.

The second modified roof panel 16 includes an upwardly extending flange 28 provided a circumferential edge of the rear hatch opening 22 that is identical to the flange 28 of FIGS. 1 to 5. The vehicle roof assembly 14 further comprises a weatherstrip 30 that is attached to the flange 28 of the roof panel 16. The weatherstrip 30 is identical to the weatherstrip 30 of FIGS. 1 to 5 and will not be further discussed. In the illustrated embodiment, the second modified vehicle roof assembly 214 further includes a second modified water deflecting bead 232 that is adjacent to the weatherstrip 30. The second modified bead 232 is identical in position to the bead 32 of FIGS. 1 and 5, but the second modified bead 232 has a different shape. In particular, the second modified bead 232 is dimensioned to increase a contact surface with the weatherstrip 30. That is, the second modified bead 232 is molded to correspond to a greater portion of the forward concealing lip 40 of the weatherstrip 30.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional tennis refer to those directions of a vehicle equipped with the vehicle roof assembly. Accordingly, these terms, as utilized to describe the present invention should be interpreted relative to a vehicle equipped with the vehicle roof assembly.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle roof panel assembly comprising:
 a roof panel partially defining a rear hatch opening, the roof panel including a flange;
 a seal fitted over a rear portion of the roof panel at a location adjacent to the rear hatch opening, the seal having a longitudinal length extending laterally across the rear portion, the seal having a forward concealing lip and a rearward concealing lip with a receiving slot therebetween, the receiving slot receiving the flange;
 a bead disposed on the rear portion of the roof panel, the bead having a longitudinal length extending laterally across the rear portion, the bead contacting the forward concealing lip of the seal along the longitudinal length of the seal; and
 a headliner fixed to the seal at the rearward concealing lip such that the forward concealing lip of the seal is sandwiched between the flange and the bead.

2. The vehicle roof panel assembly according to claim 1, wherein
 the bead is made from stamped metal that is integral with the roof panel.

3. The vehicle roof panel assembly according to claim 1, wherein
 the bead is disposed between the seal and a planar surface of the roof panel.

4. The vehicle roof panel assembly according to claim 3, wherein
 the planar surface of the roof panel is positioned in a vehicle forward direction with respect to the bead.

5. The vehicle roof panel assembly according to claim 1, wherein
 the bead is positioned in a vehicle forward direction with respect to the seal.

6. The vehicle roof panel assembly according to claim 5, wherein
 the roof panel includes a planar surface that is positioned in the vehicle forward direction with respect to the bead.

7. The vehicle roof panel assembly according to claim 6, wherein
 the roof panel includes the bead that is formed from stamping the roof panel.

8. The vehicle roof panel assembly according to claim 7, further comprising
 a headliner having an end attached to the seal at a location in a vehicle rearward direction with respect to the seal.

9. The vehicle roof panel assembly according to claim 1, wherein
 the forward concealing lip having an interior surface facing the receiving slot and an exterior surface facing away from the receiving slot, the bead contacting the exterior surface.

10. The vehicle roof panel assembly according to claim 9, wherein
 the bead is positioned between the interior surface of the seal and the receiving slot of the seal.

11. A vehicle comprising:
 a roof panel having a vehicle rooftop portion and a rear portion that is recessed and extends rearward with respect to the vehicle rooftop portion, the rear portion including a water deflecting bead protruding upward along a planar surface of the rear portion of the roof panel, the roof panel including a flange;
 a pair of side body panels, the side body panels and the roof panel together defining a rear hatch opening;
 a seal fitted over the rear portion of the roof panel at a location adjacent to the rear hatch opening, the seal having a longitudinal length extending laterally across the rear portion, the seal having a forward concealing lip and a rearward concealing lip with a receiving slot therebetween, the bead contacting the forward concealing lip of the seal along the longitudinal length of the seal, the receiving slot receiving the flange;
 a vehicle door openable and closeable over the rear hatch opening to cover the rear portion of the roof panel; and
 a headliner fixed to the seal at the rearward concealing lip such that the forward concealing lip of the seal is sandwiched between the flange and the bead.

12. The vehicle according to claim 11, wherein the bead having a longitudinal length extending laterally across the rear portion.

13. The vehicle according to claim 12, wherein the bead includes a first longitudinal end and a second longitudinal end, the first and second longitudinal ends facing the side body panels.

14. The vehicle according to claim 11, further comprising the bead is made from stamped metal that is integral with the roof panel.

* * * * *